(No Model.)
C. A. CYPHERS.
INCUBATOR.
No. 530,163. Patented Dec. 4, 1894.
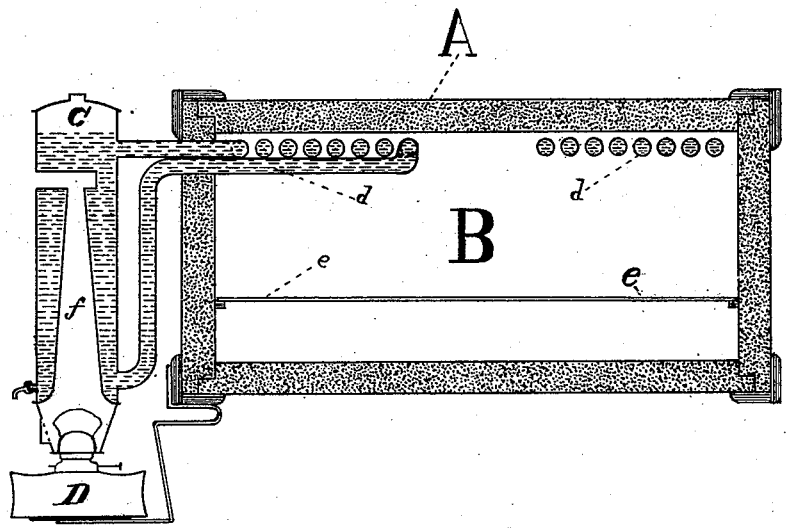
Witnesses.
Archibald MacGregor.
E. d. P. Stevens
Inventor.
Chas. A. Cyphers.

UNITED STATES PATENT OFFICE.

CHARLES A. CYPHERS, OF SOMERVILLE, MASSACHUSETTS.

INCUBATOR.

SPECIFICATION forming part of Letters Patent No. 530,163, dated December 4, 1894.

Application filed January 22, 1894. Serial No. 497,699. (No model.)

*To all whom it may concern:*

Be it known that I, CHARLES A. CYPHERS, a citizen of the United States, residing at Somerville, in the county of Middlesex and State of Massachusetts, have invented an Improvement in Incubators, of which the following is a full, clear, and exact description, reference being had to the accompanying drawing, making part of this specification, in which is represented a vertical longitudinal section through an incubator constructed in accordance with my invention.

This invention relates to an improvement in incubators or hatching devices, and has for its object to ventilate the hatching-chamber in such a manner that the rate of movement of the atmospheric air within said chamber will not be accelerated above that due to the natural diffusion of gases therein, and so that the relative humidity of the air within the hatching-chamber will be the same as that of the outer general atmosphere.

Heretofore the walls of the hatching-chamber have been constructed of materials which were impermeable to gases, and said chamber has been ventilated by means of direct openings, suitable holes having been cut through the walls of the hatching-chamber or casing for this purpose. In this case the general atmospheric air in which the device is placed passes inward through these openings *en masse*, which creates a current within the hatching-chamber. With this construction the air coming in contact with the heating surfaces gains in warmth which directly increases its capacity for taking up moisture. It now gains some humidity from the eggs and eventually passes outward, still *en masse*, which again creates a current sufficient to carry along with it its increased warmth, together with whatever gases or vapors it may have taken up during its stay in the chamber. Thus it will be seen that the capacity of the incoming air for absorbing moisture is increased with no provision for an additional gain of moisture from the outer atmosphere beyond what is originally carried in with the incoming air, as the continuous current through the direct openings prevents a reciprocatory movement between the aqueous vapor of the inner and outer atmospheres. This more or less rapid movement of the dry air within the hatching-chamber causes a too rapid evaporation from the eggs and many of the germs die from the excessive loss of water from the yolk-food upon which they are dependent for their vital activity and growth. Another ill effect of the too rapid movement of the dry air is to keep the shell of the egg dry and thus prevent it becoming brittle; that is, the embryo during incubation is continually throwing off carbon-dioxide and moisture, both being partially condensed within the walls of the shell. This combination of carbon-dioxide and moisture having a solvent action on the carbonate of lime of which the shells are composed, is sufficient to break up the natural arrangement of the particles of the shell which gives it its strength, and at the time of the exclusion of the embryo the shell is sufficiently brittle to allow the chick to easily break its way out; but where there are direct openings in the walls of the hatching-chamber, the circulation of dry air causes the carbon-dioxide and moisture to be quickly dissipated. Consequently the shells remain dry and at the time of the exclusion of the embryo they are still too strong to allow the chick to free itself. To offset as far as possible this abnormal condition which is created by the direct openings in the walls of the hatching-chamber, it has been customary to place within said chamber pans containing water so as to increase the humidity of its atmosphere, and thus check in a measure the evaporation from the surfaces of the eggs. While increasing the humidity of the atmosphere by supplied moisture within the hatching-chamber partially checks evaporation from the surfaces of the eggs, it is a well known law in physics that the rate of movement of the atmosphere has more influence over evaporation than the degree of humidity. The rate of movement of the air within the hatching-chamber has not heretofore been taken into consideration, and as the rate of exchange and consequently the rate of movement increases as the temperature of the outer air decreases, it is obvious that the rate of movement will vary and consequently the rate of evaporation will vary regardless of the degree of humidity. Hence the introduction of moisture within the hatching-chamber by means of pans containing water, although of some material service, only partially counteracts the ill effects of the direct openings.

In natural incubation, the eggs are surrounded by a mass of down and feathers which are porous and allow of a reciprocatory molecular movement of the constituent gases and vapors of the air immediately surrounding the eggs and the general atmosphere outside of the feathers, while they are so dense that any current in an inward or outward direction is held in check by frictional resistance, its rate of movement at no time being greater than that caused by the natural diffusion of gases. The air immediately surrounding the eggs is therefore always maintained pure for the reason that any excess of gases or vapors in it would cause an outward movement to set in, molecular exchanges of its gaseous impurities for pure respirable air being thus effected with perfect ease.

As the pure colder air passes inward, it gains in warmth which increases its capacity for absorbing moisture, the tension or force exerted by its aqueous vapor decreasing as the temperature rises. In this case however as the tension of the vapor in the atmosphere immediately surrounding the eggs decreases in the gain of warmth the greater tension of the aqueous vapor in the outer colder atmosphere immediately causes an inward movement of vapor to set in which keeps pace with the increasing warmth of the inner air, and thus the relative humidity of the inner and outer atmospheres is always maintained; that is, the amount of aqueous vapor contained in the inner air must be equal for its own temperature, to that contained in the outer general atmosphere for its temperature, and as the hen hatches an equally large percentage of the fertile eggs when the general atmosphere is very humid as when it is quite dry, it is obvious that if the relative humidity of the two atmospheres is maintained, and the movement of the air within the hatching chamber is not accelerated beyond that due to the natural diffusion of gases, in artificial incubation no supplied moisture would be necessary. To attain this end I find it necessary to construct the walls of the hatching chamber, which represent the covering of down and feathers in natural incubation, of a porous material, thus obviating the necessity of direct openings through the walls of said chamber with their inevitable ill effects.

For some reasons I have found it desirable to construct the entire walls or casing of the hatching chamber of a porous material, although only a portion need be so constructed, but with less perfect results. I have found a material composed of vegetable fiber ground to a fine pulp, pressed and dried, commercially known as "fiber stock" to be best adapted to take the place of the natural wall of down and feathers. This material is intensely porous and is used without any dressing or finish that interferes with the natural diffusion of gases or vapors through its minute apertures. I have however found other porous substances such as wool or cotton compressed in a foraminous frame or holder composed of wire gauze or other suitable material to answer the same function, although the "fiber stock" is best adapted for the purpose in many ways.

With the walls of the hatching-chamber composed of a porous material such for instance as "fiber stock," the atmosphere within the hatching-chamber is always maintained pure for the reason that any gases thrown off by the incubating eggs directly increases the tension of those gases within said chamber above that in the general atmosphere on the outer side of the walls of said chamber, and a reciprocatory molecular movement of the two atmospheres immediately sets in through the porous walls of the hatching-chamber and thus maintains the inner atmosphere respirably pure. The relative humidity of the inner and outer atmospheres is also maintained at the same point, as in natural incubation, as any increase in one causes a corresponding movement to set in toward the other, which tends to restore the equilibrium; while aqueous vapor will pass neither inward nor outward when it exists in the same proportion on either side of the walls of the hatching-chamber, but dry gaseous impurities only will be exchanged for dry pure air in proportion to their equivalent volumes of diffusion.

In the said drawing, A represents the walls or casing of the incubator composed of porous material, preferably "fiber stock" as above described.

B is the hatching-chamber within which is disposed a shelf or tray $e$ upon which are placed the eggs to be hatched.

C is a hot-water boiler disposed on the outside of the apparatus and provided with suitable induction and eduction pipes connected with a series of circulating pipes $d$ disposed in any suitable manner within the hatching-chamber B, preferably near the top of the same as shown.

The boiler C is provided with a central conical flue or passage $f$ beneath which is placed a lamp D, whereby the water is heated in the usual manner. The construction and arrangement of the boiler and the pipes connected therewith are however well known and form no part of my present invention.

In a hatching chamber thus constructed, incubation of the eggs goes on naturally from first to last, with no excesses and no abnormities.

What I claim as my invention, and desire to secure by Letters Patent, is—

1. As an improved article of manufacture an incubator consisting of an egg receptacle or hatching chamber provided with suitable means for applying warmth to the interior thereof; the said hatching chamber having non-apertured or imperforate walls, one or more of which are formed of a porous material pervious to air and gases, and the pores or interstitial passages of said wall or walls connecting the interior of the chamber with the outer air to permit of a diffusive or molecular ventilation; the impure air and gases passing from the inside of the chamber outwardly through said pores, and the outer pure air inwardly therethrough, substantially as herein described.

2. As an improved article of manufacture an incubator consisting of an egg receptacle or hatching chamber having a non-apertured porous composite wall or walls formed of fiberstock and pervious to air and gases to permit of a molecular or diffusive ventilation of said chamber through the said pores or interstices, and a means for applying warmth to the interior of the chamber or receptacle, substantially as herein described.

Witness my hand this 19th day of January, A. D. 1894.

CHARLES A. CYPHERS.

In presence of—
P. E. TESCHEMACHER,
HARRY W. AIKEN.